H. S. CURRIER.
TRANSMISSION LOCK.
APPLICATION FILED FEB. 28, 1918.

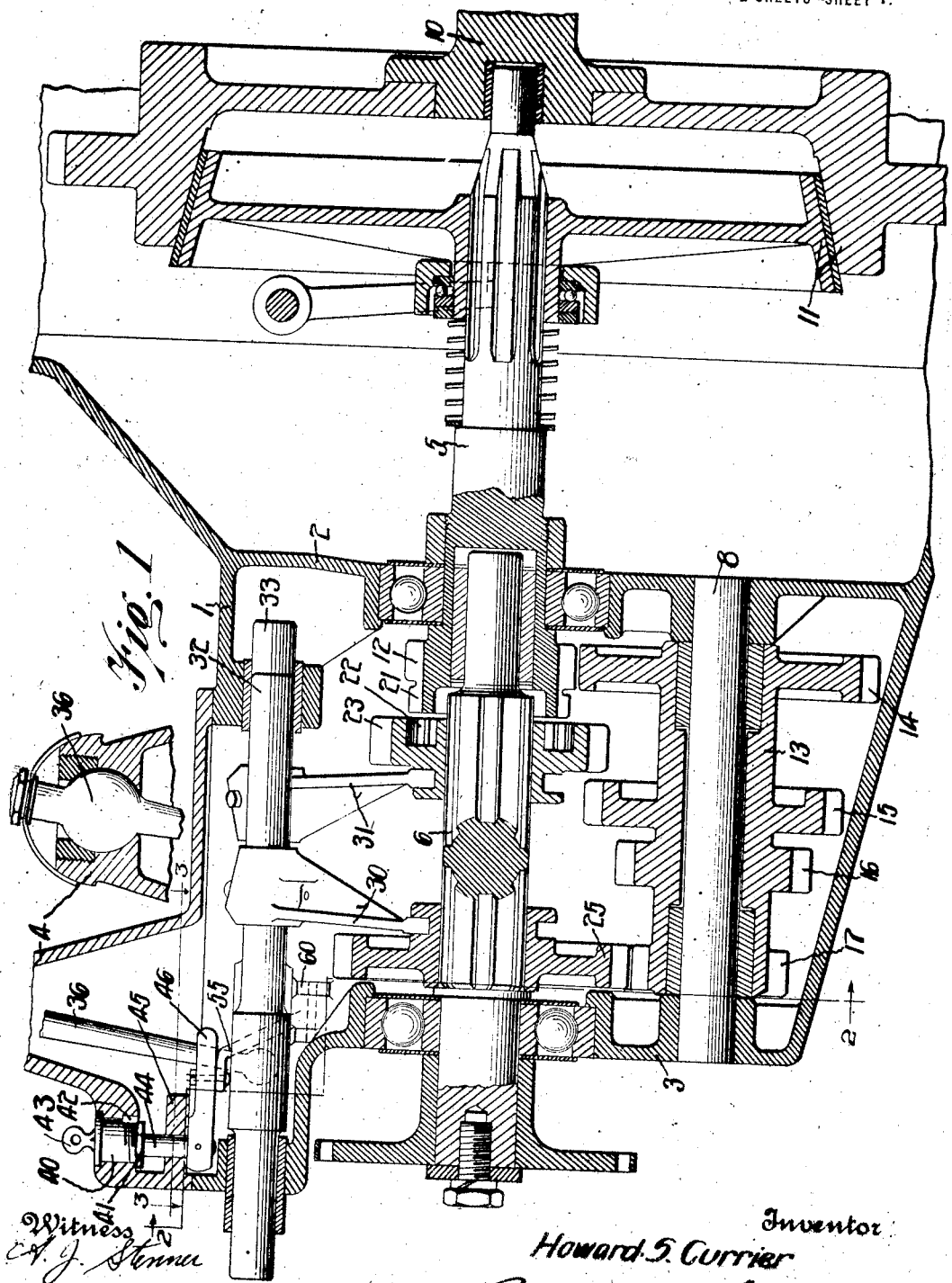

1,328,724.

Patented Jan. 20, 1920.
2 SHEETS—SHEET 2.

Witness
A. J. Stenner

Inventor
Howard S. Currier,
By Pagelsen & Spencer
Attorneys

UNITED STATES PATENT OFFICE.

HOWARD S. CURRIER, OF DETROIT, MICHIGAN.

TRANSMISSION-LOCK.

1,328,724.

Specification of Letters Patent.    Patented Jan. 20, 1920.

Application filed February 28, 1919. Serial No. 279,699.

*To all whom it may concern:*

Be it known that I, HOWARD S. CURRIER, a citizen of the United States, and residing at Detroit, in the county of Wayne and State of Michigan, have invented a new and Improved Transmission-Lock, of which the following is a specification.

The present invention relates to vehicle locking means, its object being to provide a device that so cripples the vehicle as to prevent it from being driven or towed away by thieves and which nevertheless permits movement to the extent required as a safeguard against fire.

One feature of the invention consists in means associated with the transmission, say with the gearing, the control lever or both—but preferably the latter—and operative when locked to prevent the car from being driven forwardly and yet permitting such movement rearwardly.

Again, the invention consists in mechanism housed within a transmission casing and adapted when in one position to prevent and adapted when in one position to prevent movement of an element of said transmission, for example, a gear or a control lever, and also adapted to permit such movement freely when in another position, and a lock carried by the casing and adapted to receive a controlling key, whereby the locking mechanism may be operated without dis-assembling the casing.

The invention also consists in inter-connected locking elements, both housed in the transmission casing and one being operative on a control member whereas the other is adapted to prevent rotation of a member which must function in order to permit certain prescribed movements, together with a single lock exposed to receive a key whereby the locking elements are actuated.

The invention further consists in certain other arrangements of parts and in certain details shown, described and claimed.

Figure 3:
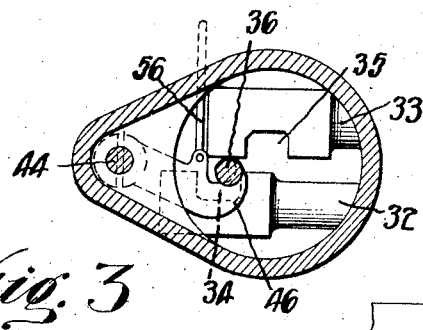
Figure 2:
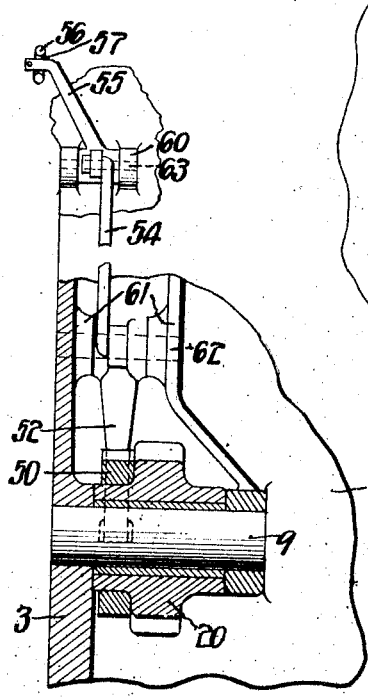
Figure 4:
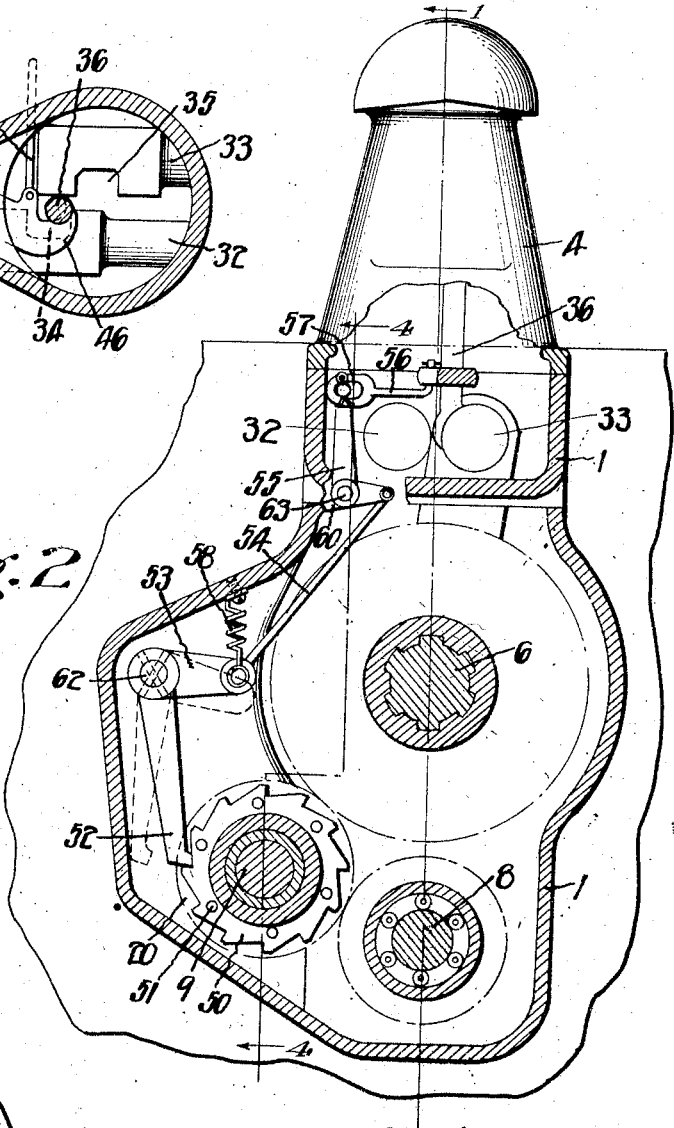

In the drawings, Figure 1 is a vertical section through a transmission provided with a preferred embodiment of the invention, the section being on broken line 1—1 of Fig. 2. Fig. 2 is a section on the line 2—2 of Fig. 1. Figs. 3 and 4 are fragmentary sections on lines 3—3 and 4—4, respectively, of Fig. 2.

The transmission shown comprises the casing 1 having the front and rear walls 2 and 3, the control lever housing 4, a main drive shaft comprising a front or power applying section 5 and a rear or power receiving section 6, the stationary countershaft 8 and the idler shaft 9. The shaft section 5 is driven from the engine shaft 10 by means of a suitable clutch 11 and is provided with means such as the gear teeth 12 whereby the stepped gear 13 on the countershaft 8 is constantly driven therefrom. As shown, this gear is made in one piece and has four sets of teeth 14—15—16—17, but any of the usual mechanical equivalents such as a rotatable countershaft having the same or a different number of separate gears might be used. The idler shaft 9 carries a gear 20 which meshes with the teeth 17. The shaft section 5 also has clutch jaws 21 arranged to be engaged by jaws 22 on a gear 23 that is slidable on the central splined portion of the shaft section 6 and of proper pitch to mesh with the teeth 15 when in rearmost position, thus providing for either high or second speed forward, and for a neutral condition. Also splined on the shaft 6 is a second slidable gear 25 the teeth of which are adapted to mesh with either the teeth 16 or 20 whereby the low speed forward and the reverse may be secured.

Any suitable means may be employed for shifting the gears, that shown consisting of the yokes 30—31 rigid with the longitudinally slidable shifter bars 32—33 having associated notches 34—35 in one or the other of which the end of the control lever 36 (mounted for universal swinging movement) is received. The mechanism thus far described is of well known construction and has been shown and explained for the purpose of indicating a desirable transmission to which the invention may be applied: it will be evident later that the invention is applicable to transmission wherein the arrangement of parts is widely different.

In the present embodiment of the invention, 40 indicates a lock housing which is secured in the element 4 of the casing in any suitable way, say by a nut 41 and dowel or pin 42. As the details of the lock may be varied widely and are not material to the invention, they are not shown, but it will be understood that by the use of a suitable key 43 the stem 44 (the end portion of which may be mounted in a lug 45) may be given angular movement to thereby throw the hook 46 into or away from the path of the lever 36.

It is evident that the car would be locked against being driven forwardly by the engine if the parts were so arranged as to lock the lever in neutral position, but this would not prevent it from being towed away by thieves, and I therefore prefer to so construct the parts that the locking takes place when the lever is in position to drive rearwardly, that is, when the gear 25 is in mesh with the idler 20, as shown. In other words, this arrangement meets the underwriters requirements in so far as capability or removal from fire is concerned, and yet so cripples the car that any attempt to tow it away would quickly attract attention.

Were no means provided to prevent it, the car could be towed forwardly, even when the hook 46 is in locking position, by disengaging the engine from the shaft 5; I, therefore, as a convenient means for accomplishing the purpose, provide the idler 20 with a ratchet wheel 50, rigidly connected thereto as by means of the pins 51, and prevent rotation (in the direction these parts must turn when the car is towed forwardly) by means of the pawl 52 which is held out of engagement therewith when the hook 46 is out of the path of the lever 36. A good example of means for interconnecting the pawl 52 and the element 46 consists in the arm 53 (that may be integral with the pawl) the link 54, the bell crank 55, the link 56 (the latter slotted at 57) and the tension spring 58. When the hook 46 is swung to the locking position, the spring 58 tends to hold the pawl and associated mechanism in the position indicated in Fig. 2, whereby the gear 20 is prevented from turning in the direction in which it must turn when the vehicle is towed forwardly, but will permit movement in the opposite direction, the arm of the bell crank then working back and forth in the slot 57. On the other hand, when the lever 36 is un-locked the pawl assumes the position shown in dotted lines in Fig. 2, and the gear 20 is free to turn.

The wall of the casing is preferably provided with lugs 60, 61 for rigidly supporting the shafts 62, 63 of the bell-cranks 52—53 and 55.

Obviously, the details of the locking mechanism will vary considerably when applied to different styles of transmissions, for example, elements other than the swinging hook 46 may serve to retain the control lever, but the device in any event need occupy but little space. I do not, therefore, wish to be limited except as indicated by the subjoined claims.

I claim:

1. In combination with a transmission having a casing, speed changing mechanism and selecting means therefor housed in said casing, said speed changing mechanism including a rotatable element, and inter-connected members movable respectively into the path of a portion of the selecting means, and into the path of said rotatable element, and a lock accessible from outside of the casing whereby said inter-connected members may be secured in a desired position with reference to their operatively associated parts.

2. In combination with a transmission having a casing, speed changing mechanism therein adapted to drive a vehicle forwardly or rearwardly at will, a selective device for said speed changing mechanism, means housed in the casing for holding the selective device in the position of rearward driving, and a lock accessible from outside the casing for controlling said holding means.

3. In combination with a driving shaft and a driven shaft alined therewith, means for interconnecting said shafts so that the latter turns in the same direction as the former, means for inter-connecting said shafts so that the driven shaft turns oppositely to the driving shaft, means for selectively making said connections, and a device movable into the path of a portion of said last named means for locking it in the position in which the driven shaft turns oppositely to the driving shaft.

4. In mechanism of the class described, a casing, a gear shifting lever projecting into said casing and forming part of a speed changing gear shifting device, a power transmitting element in said casing which may be caused to rotate in either direction, means within the casing for preventing movement of said lever and for also preventing rotation of said element, and a single lock accessible from outside the casing for controlling said means.

5. In combination with a transmission adapted for use in motor vehicles and including a driving shaft and a driven shaft, means for inter-connecting said shafts so that the latter turns oppositely to the former, a ratchet wheel driven in one direction when the shafts are so connected, a spring pressed pawl adapted to coöperate with said ratchet wheel to prevent movement in the opposite direction and arranged to snap down successively on the teeth of said wheel when the latter turns in the direction first stated, means for removing said pawl from the path of the wheel and for locking it in the last named position.

6. In combination with a transmission having a casing with an opening in its upper side, a control lever housing covering said opening, a member within said casing rotatable when the vehicle is moved forwardly, and means for preventing the rotation of said member at will, said means including a lock carried by said housing, and a device positioned adjacent said member and engageable therewith when the lock is in one position.

7. In combination with a transmission including a casing having an opening in one side, a control lever housing mounted on the casing around said opening, a control lever carried by said housing, a lock also carried by said housing, a rotatable member within the casing, and means, independent of the control lever and controlled by the lock for preventing the rotation of said rotatable member in one direction.

8. In combination with a transmission having a casing, speed changing mechanism and selecting means therefor housed in said casing, said speed changing mechanism including a rotatable element, and inter-connected members movable respectively into the path of said rotatable element and of said selecting means, a lock accessible from outside of the casing whereby said interconnected members may be secured in a desired position with reference to their operatively associated parts, the means for connecting said inter-connected members permitting rotation of said rotatable element in one direction while the lock is in position to prevent such rotative movement in the opposite direction.

9. In mechanism of the class described, a casing, a gear shifting lever projecting into said casing and forming part of a speed changing gear shifting device, a rotatable power transmitting element in said casing, means within the casing for preventing movement of said lever and for also preventing rotation of said element in one direction only, and a single lock accessible from outside the casing for controlling said means.

HOWARD S. CURRIER.